Patented June 13, 1944

2,351,024

UNITED STATES PATENT OFFICE 2,351,024

GLYCERINE ARYL METHYL ETHERS

Theodore W. Evans and Kenneth E. Marple, Oakland, Calif., assignors to Shell Development Company, San Francisco, Calif., a corporation of Delaware No Drawing. Application August 30, 1940,
Serial No. 354,836

10 Claims. (Cl. 260—615)

This invention relates to novel aryl methyl ethers of glycerines and to a method for their preparation. More particularly, the invention deals with glycerine phenyl methyl ether and to a process which enables high yields of this particularly useful compound to be obtained.

It is an object of the present invention to provide a novel class of compounds having properties which make them particularly useful and valuable. A further object is to provide a method for preparing the novel aryl methyl ethers of glycerines which is readily adaptable to large scale production of these compounds by reason of the high yields obtainable and the employment of readily available reagents.

By the term, aryl methyl ethers of glycerines, is meant those compounds which are derived from a glycerine or trihydric alcohol by substitution of the hydrogen atom of one of the hydroxyl groups by an aryl group, substitution of the hydrogen atom of another hydroxyl group by a methyl group, and the presence of the third hydroxyl group in a free or unsubstituted condition. Of this class of compounds, the member of perhaps the simplest structure is glyceryl α-methyl α'-phenyl ether. A preferred group of the class of compounds of the invention are derivatives of glycerol, among which may be named, besides the above-mentioned member, such representative compounds as glyceryl α-methyl β-phenyl ether, glyceryl α-phenyl β-methyl ether, glyceryl α-methyl α'-tolyl ethers derived from ortho, meta or para cresol or mixtures thereof, glyceryl α-methyl β-tolyl ethers, glyceryl α-tolyl β-methyl ethers, a like series of compounds of glyceryl methyl xylyl ethers, and the like. If desired, the aryl radical of the compound may be a binuclear or trinuclear aromatic radical such as is present in the compound glyceryl α-methyl α'-naphthyl ether. Other less preferred compounds of the invention are derivatives of other trihydric alcohols than glycerol. Reference is made to such compounds as the following which are representative: β-methyl glyceryl methyl phenyl ethers, β-methyl glyceryl methyl tolyl ethers, α-methyl glyceryl methyl phenyl ethers, α-methyl glyceryl methyl xylyl ethers, β-isobutyl glyceryl methyl naphthyl ethers, α-phenyl glyceryl methyl phenyl ethers, pentaglyceryl methyl phenyl ethers, pentaglyceryl methyl tolyl ethers, and the like. The compounds may be substituted in the aryl radical or in the trihydric alcohol of which they are derivatives by suitable substituents such as halogen atoms, hydroxyl groups, alkoxy groups, aryloxy groups, aralkoxy groups, and the like, provided the compounds contain the methyl group, the aryl group substituted or not, and the free hydroxyl group.

The aryl methyl ethers of a glycerine are particularly useful compounds. It has long been known that ethers are not solvents for plastic substances widely used in industry like nitrocellulose and cellulose acetate. Notwithstanding, it has now been discovered that the aryl methyl ethers of a glycerine, although these compounds are primarily ethers, are excellent solvents for such plastics. Their ability to dissolve these substances may be due to the combination of groups present in the molecule, namely, the aryloxy group, the methoxy group, and the free hydroxyl group. It appears, however, that the solvent powers of the compounds of the invention reside primarily in the methoxy group since similar compounds which contain instead higher groups are poor solvents or non-solvents for nitrocellulose or cellulose acetate. The aryl methyl ethers of a glycerine of the invention are superior compounds to the higher derivatives with respect to this important property of solvency. They are high boiling substances which may be used in a variety of coating compositions, laminating compositions, impregnating compositions, and the like. Besides being solvents for nitrocellulose and cellulose acetate, the compounds are also solvents for other plastics such as polyvinyl acetate. Further in connection with these plastics, because of their high boiling point and low volatility, they may be employed to plasticize and soften plastic materials. Other uses are as chemical intermediates in the preparation of further derivatives, as solvents in extraction processes, etc.

The aryl methyl ethers of a glycerine are prepared by reacting a metal salt of a phenol with a monomethyl ether of a glycerine halohydrin in the presence of a solvent in which metal halide salts are not appreciably soluble and in which water is appreciably soluble. We have discovered that by conducting the reaction in the presence of such a solvent the yields of the desired product are much higher than in its absence. Besides the better yields obtainable, another advantage in employing a solvent of these characteristics is that it provides a means of separating the salt which is a product of the reaction from the reaction mixture. Thus, after the reaction has been completed, the salt may be filtered from the reaction mixture and the desired product then distilled from the mixture without the inherent difficulties of distilling a mixture containing salt, such as the deposition and caking of the salt on the heating surfaces of the still, etc.

It is sometimes preferable that the solvent employed in the reaction mixture have an appreciable solubility for water as well as having the characteristic that the salt formed during the reaction be substantially insoluble therein. This property of the solvent is desirable since the metal salt of a phenol employed as one reactant may be prepared by reacting a metal hydroxide or aqueous solution or suspension thereof with a phenol and conducting the reaction with the salt of the phenol without removing the accompanying water. If water is present in the reaction mixture in this manner, it is preferable that the solvent have an appreciable solubility for water so as to maintain the reaction mixture in a homogeneous state with only a single liquid phase. While the reaction may be carried out in a two-phase system, better results are obtained when only one phase exists.

The most suitable solvent for use in executing the process of the invention, besides being a non-solvent for salt and at least a partial solvent for water, should be substantially inert under the reaction conditions. Particular compounds which are suitable to be employed in the present process include isopropyl alcohol, normal propyl alcohol, normal butyl alcohol, secondary butyl alcohol, isobutyl alcohol, tertiary butyl alcohol, the amyl alcohols, etc. A particularly preferred group of compounds are the dioxanes such as dioxane, 2,5-dimethyl dioxane-1,4, 2,5-diethyl dioxane-1,4, tetramehyl dioxane, etc. Furthermore, solvent mixtures of the type of ethyl alcohol and benzol, ethyl alcohol and toluol, and isopropyl alcohol and benzol are also suitable.

In the execution of the process a metal salt of a phenol is reacted with a monomethyl ether of a glycerine monohalohydrin. A variety of compounds are included within the expression "a monomethyl ether of a glycerine monohalohydrin." Suitable compounds as reactants are among others α-methyl ether of glycerol chlorhydrin, β-methyl ether of glycerol bromhydrin, α-methyl ether of α-methyl glycerol chlorhydrin, β-methyl ether of β-methyl glycerol chlorhydrin, α-methyl ether of α-cyclohexyl glycerol chlorhydrin, α-methyl ether of α-phenyl glycerol bromhydrin, methyl ether of pentalglycerol chlorhydrin, and the like. An excellent method of obtaining certain of the methyl ethers of a glycerine halohydrin is disclosed in our copending application with Shokal, Serial No. 300,818, filed October 23, 1939, now Pat. No. 2,260,573. The method consists of reacting an epihalohydrin with methyl alcohol in the presence of a catalyst which consists of an acid-acting inorganic fluorine-containing compound such as hydrofluoric acid. Said process coupled with the present process provides an efficient and practical method of preparing some of the products of the invention.

The other reactant consisting of a metal salt of a phenol includes any suitable metal salt of any phenol. A phenol includes such varied compounds as phenol, the cresols, the xylenols, the higher alkylated phenols as well as binuclear compounds like α-naphthol, β-naphthol and the like as well as their homologues, analogues and substitution products, it only being necessary that the compound contain a hydroxyl-group linked directly to an aromatic nucleus. By reacting such phenols with a metal hydroxide, the desired metal salt of the phenol is obtained. Ordinarily, alkali metal hydroxides are preferred for this purpose, and consequently, an alkali metal salt of a phenol is a preferred reactant. Largely because of cheapness and ready availability of sodium hydroxide, the sodium salts form a most preferred group.

The process of the invention may be executed in a variety of modes. A phenol may be taken and the metal salt formed by reacting it with a metal hydroxide. For this purpose, the metal hydroxide may be employed per se or in aqueous solution or suspension. Furthermore, this reaction may be conducted in the presence of the solvent in which the metal salt is insoluble. The resulting metal salt of the phenol is then reacted with a monomethyl ether of a glycerine monohalohydrin. This reaction is preferably obtained at temperatures between about 50° C. and 200° C. A most preferred temperature is in the neighborhood of about 100° C. With the higher temperatures it may be desirable to employ superatmospheric pressures in order to keep the reactants, products and solvent substantially in the liquid phase. The second reaction is conducted in the presence of the solvent. The proportion of solvent employed in the reaction mixture will depend upon a number of variables such as the properties of the particular solvent, the desirability of maintaining a single liquid phase, the temperature at which the reaction is carried out, etc. Upon completion of the reaction, salt may be removed from the reaction mixture by filtration, decantation, centrifugation, etc. The aryl methyl ether of a glycerine may then be recovered from the reaction mixture, this recovery preferably being done by distillation under reduced pressures, although it may be desirable to top off the solvent and water at ordinary pressure.

The following examples illustrate a way in which the principle of the invention has been applied, but are not to be construed as limiting the same.

*Example I*

About 94 gms. of phenol and 75 cc. of dioxane were placed in a three-necked flask equipped with a stirring motor and a reflux condenser. The mixture was heated to about 100° C. and about 43 gms. of powdered sodium hydroxide (96% tech.) were added over a period of about an hour followed by stirring for an additional hour. Then about 130 gms. of α-methyl ether of glycerol chlorhydrin were added over a period of approximately 90 minutes at a temperature of 103° C.–109° C. The reaction mixture was filtered while hot and the salt thus filtered out was washed twice with about 100 cc. of warm alcohol. The washings were combined with the filtered reaction product and the mixture distilled under reduced pressure from a Claisen flask. About 153 gms. of α-methyl α'-phenyl glyceryl ether were obtained as product which amounted to a yield of approximately 80.5%. The properties of this novel ether were as follows:

Boiling point_____ 94.6–95.4 at 0.5 m.
Specific gravity, $20_4$_____ 1.104
Refractive index, $20_D$_____ 1.519
Carbon_____per cent__ 65.8 (theoretical 65.9)
Hydrogen_____do____ 7.8 (theoretical 7.7)
Acetyl value, equiv. 100 gms.
    0.547, 0.550 (theoretical 0.550)

*Example II*

About 110 gms. of sodium hydroxide were added to about 235 gms. of phenol in 150 cc. of dioxane over a period of 1½ hours at a temperature of approximately 105° C. followed by 2 hours of stirring of the reaction mixture at about the same temperature. About 311 gms. of the chlorhydrin of α-methyl ether of glycerol were then added over a period of 2 hours followed by stirring for 1 hour. The temperature during the latter operation was between about 102° C. and 113° C. The reaction mixture was filtered and the salt obtained washed with two portions of ethyl alcohol. The filtrate, which was slightly alkaline, was neutralized with 7 cc. of 12N hydrochloric acid, filtered again, and distilled from a Claisen flask under reduced pressure. About 437 gms. of α-methyl α'-phenyl glyceryl ether was obtained which amounted to a yield of 96.1%.

We claim as our invention:

1. A process for the production of an aryl methyl diether of glycerol which comprises the steps of reacting a phenol with sodium hydroxide to form a sodium salt of said phenol, reacting said sodium salt with α-monomethyl ether of glycerol monochlorhydrin in the presence of dioxane, filtering formed sodium chloride from the reaction mixture, and distilling the α-aryl α'-methyl glyceryl diether from the reaction mixture at subatmospheric pressure.

2. A process for the production of an aryl methyl diether of glycerol which comprises the steps of reacting a phenol with sodium hydroxide to form a sodium salt of said phenol, reacting said sodium salt with α-monomethyl ether of glycerol monochlorhydrin in the presence of isopropyl alcohol, filtering formed sodium chloride from the reaction mixture, and distilling the α-aryl α'-methyl glyceryl diether from the reaction mixture at subatmospheric pressure.

3. A process for the production of an aryl methyl diether of glycerol which comprises the steps of reacting a phenol with sodium hydroxide to form a sodium salt of said phenol, reacting said sodium salt with α-monomethyl ether of glycerol monochlorhydrin in the presence of secondary butyl alcohol, filtering formed sodium chloride from the reaction mixture, and distilling the α-aryl α'-methyl glyceryl diether from the reaction mixture at subatmospheric pressure.

4. In a process for the production of an aryl methyl diether of a glycerine, the step which comprises reacting a sodium salt of a phenol with α-monomethyl ether of glycerol monochlorhydrin in the presence of dioxane.

5. In a process for the production of an aryl methyl diether of a glycerine, the step which comprises reacting a sodium salt of a phenol with α-monomethyl ether of glycerol monochlorhydrin in the presence of isopropyl alcohol.

6. In a process for the production of an aryl methyl diether of a glycerine, the step which comprises reacting a sodium salt of a phenol with α-monomethyl ether of glycerol monochlorhydrin in the presence of secondary butyl alcohol.

7. A process for the production of an aryl methyl diether of a trihydric alcohol which comprises the steps of reacting a phenol with a metal hydroxide to form a metal salt of said phenol, reacting said metal salt with a monomethyl ether of a monohalohydrin of a trihydric alcohol in the presence of an inert solvent in which metal halide salt is substantially insoluble and in which water is appreciably soluble, removing formed metal halide salt from the reaction mixture, and recovering the aryl methyl diether of a trihydric alcohol from the reaction mixture.

8. A process for the production of an aryl methyl diether of a trihydric alcohol which comprises reacting a phenol with an alkali metal hydroxide to form an alkali metal salt of said phenol, reacting said alkali metal salt with a monomethyl ether of a monohalohydrin of a trihydric alcohol in the presence of a solvent from the group consisting of isopropyl alcohol, normal propyl alcohol, normal butyl alcohol, secondary butyl alcohol, tertiary butyl alcohol, the amyl alcohols, the dioxanes, and mixtures of an alcohol and a lower aromatic hydrocarbon, filtering formed alkali metal halide from the reaction mixture, and distilling the aryl methyl diether of a trihydric alcohol from the reaction mixture at subatmospheric pressure.

9. In a process for the production of an aryl methyl diether of a trihydric alcohol, the step which comprises reacting a metal salt of a phenol with a monomethyl ether of a monohalohydrin of a trihydric alcohol in the presence of an inert solvent in which metal halide salt is substantially insoluble and in which water is appreciable soluble.

10. In a process for the production of an aryl methyl diether of a trihydric alcohol, the step which comprises reacting an alkali metal salt of a phenol with a monomethyl ether of a monohalohydrin of a trihydric alcohol in the presence of a solvent from the group consisting of isopropyl alcohol, normal propyl alcohol, normal butyl alcohol, secondary butyl alcohol, tertiary butyl alcohol, the amyl alcohols, the dioxanes and mixtures of an alcohol and a lower aromatic hydrocarbon.

THEODORE W. EVANS.
KENNETH E. MARPLE.